Nov. 3, 1925.
A. N. CRAMER
1,559,854
GLASS MOLDING APPARATUS
Filed Dec. 16, 1920    2 Sheets-Sheet 1
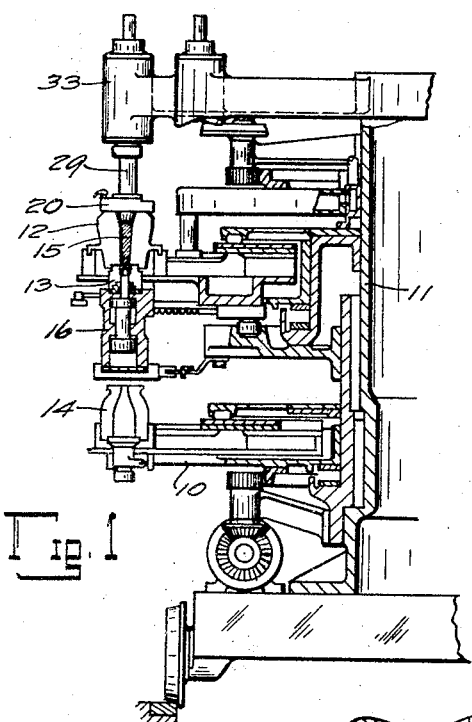
Fig. 1
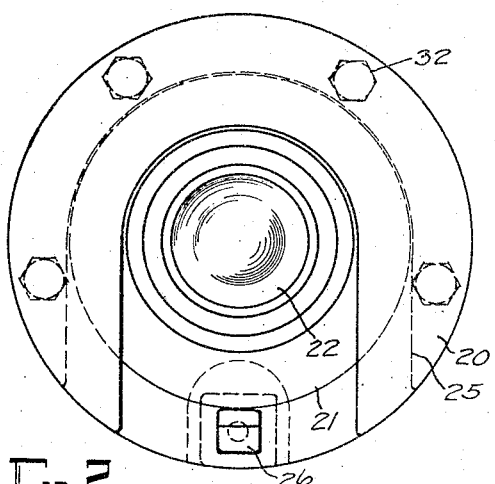
Fig. 2
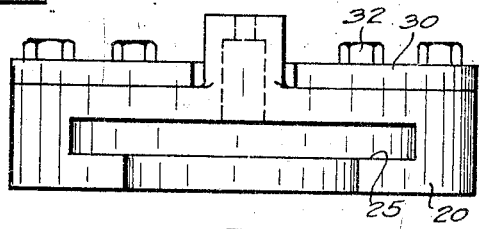
Fig. 3
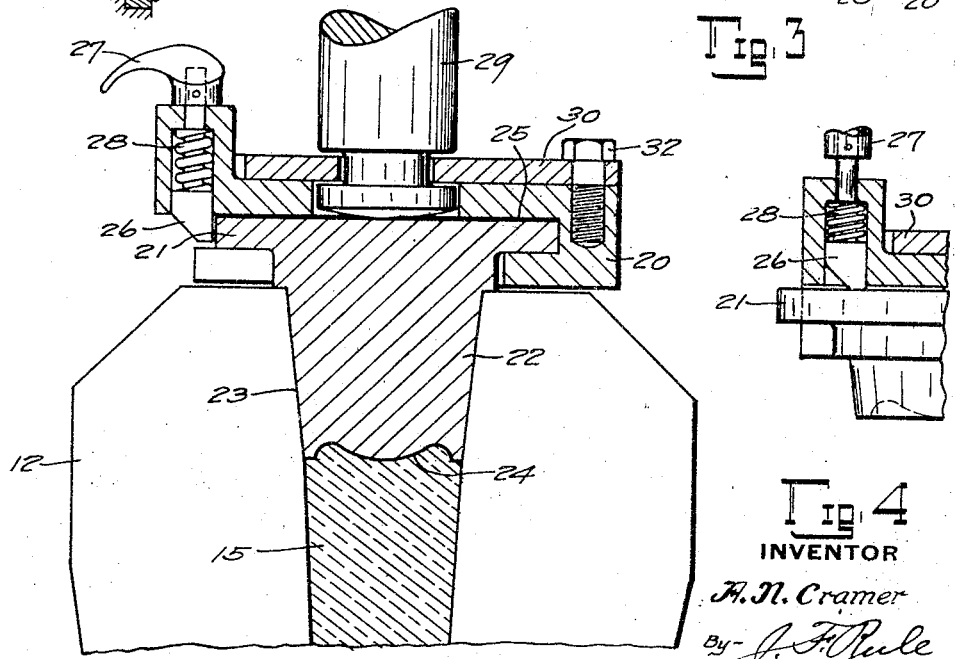
Fig. 4
Fig. 5
INVENTOR
A. N. Cramer
By J. F. Rule
Attorney Nov. 3, 1925.
A. N. CRAMER
1,559,854
GLASS MOLDING APPARATUS
Filed Dec. 16, 1920    2 Sheets-Sheet 2
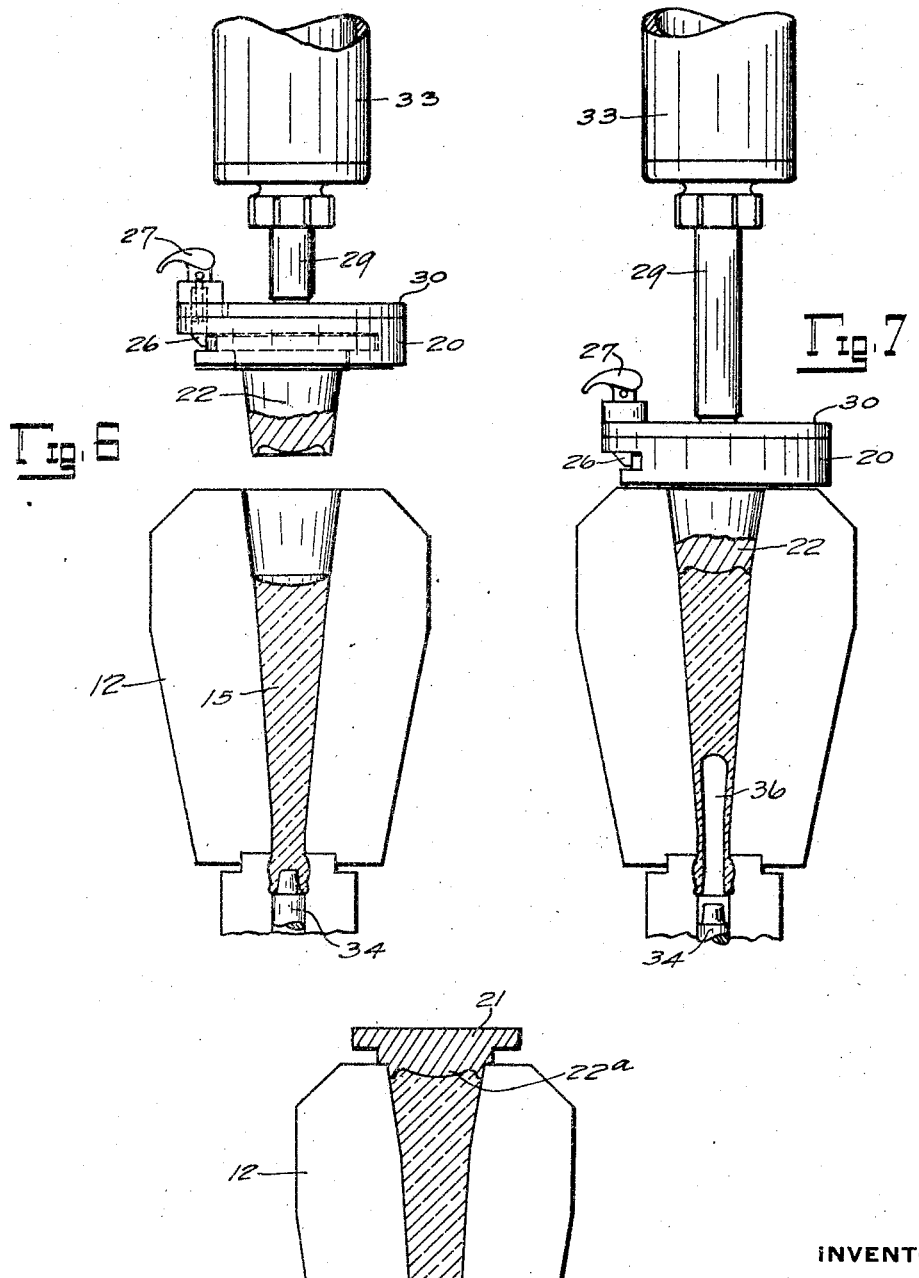
INVENTOR
A. N. Cramer
By
His Attorney Patented Nov. 3, 1925.

1,559,854

UNITED STATES PATENT OFFICE.

ALBERT N. CRAMER, OF TOLEDO, OHIO, ASSIGNOR TO THE OWENS BOTTLE COMPANY, OF TOLEDO, OHIO, A CORPORATION OF OHIO.

GLASS-MOLDING APPARATUS.

Application filed December 16, 1920. Serial No. 431,070.

*To all whom it may concern:*

Be it known that I, ALBERT N. CRAMER, a citizen of the United States, residing at Toledo, in the county of Lucas and State of Ohio, have invented new and useful Improvements in Glass-Molding Apparatus, of which the following is a specification.

My invention relates particularly to blank molds for receiving charges of molten glass, and means for forming a temporary closure for the charge receiving end of the mold after the charge has been introduced. The invention is herein shown as applied to a glass blowing machine of the Graham type which comprises inverted blank molds mounted on a rotating carriage and brought successively into position to receive a charge of glass. The charge is introduced through the open upper end of the inverted mold. A closing head or plate is then brought down onto the mold to close the same. Air under pressure is introduced at the lower end of the mold to expand the glass against the walls of the mold and said closing head.

The invention comprises an improved head or mold closure having an extension or core adapted to enter the mold a certain distance, thereby reducing the capacity or size of the mold cavity. The upper walls of the mold cavity may be flared outwardly, the entering core of the closing head being correspondingly shaped to closely fit said walls. This construction permits the blank mold to be of considerably greater capacity than the charge of glass and permits the charge or gob of glass to be introduced to the mold with much greater ease and certainty than with the form of mold heretofore in use. The flaring or widening of the mouth of the mold cavity also facilitates the introduction of the gob of glass. This is of particular advantage in connection with machines of the continuously rotating type in which the charge must be dropped into the mold during the brief interval of time the mold is passing the charging station, unless special means are provided for guiding the charge into the mold. A further advantage obtained by the present invention is that the size or capacity of the mold may be readily varied by changing the closing heads, which for this purpose may be provided with cores which will enter the molds to a greater or less distance. In this manner the blank molds are adapted for making bottles or other ware of any size and capacity within the limits for which they are designed. This is of practical importance as it eliminates the necessity of changing the blank molds when it is desired to make a different sized article on the machine, and also greatly reduces the number of molds required when the machine is used to make articles of different sizes or weights.

A further object of the invention is to provide means for reducing the capacity of the mold cavity to approximately that of the charge of glass therein so that when the blank is blown by applying air pressure at the opposite end thereof, the cavity blown in the blank is comparatively small. This overcomes an objection experienced in the operation of machines of this type in which the blowing of the blank in the blank mold has resulted in forming a parison in which the blown cavity is of considerable size extending a greater portion of the length of the parison. When such hollow parison is blown in the finishing mold there is an uneven distribution of the glass, resulting in a wavy appearance in the walls of the finished article. This objection is overcome by the use of the present invention.

The invention further comprises a novel method of supporting the blank mold closing head, permitting the latter to be quickly removed and replaced by one of a different size, without interrupting the operation of the machine.

Other features and advantages will appear hereinafter.

The present application discloses certain subject matter also disclosed in my co-pending application Serial Number 712,140, filed May 9, 1924.

In the accompanying drawings:

Figure 1 is a sectional elevation of a machine of the Graham type to which my invention is applied, some parts of the machine being broken away and others shown diagrammatically.

Figure 2 is a bottom plan view of the mold closing plate and its supporting head.

Figure 3 is an elevation of the supporting head.

Figure 4 is a detail showing the position of the locking detent while the closure plate is partially withdrawn from the head.

Figure 5 is a part sectional view of the mold and the closure plate in position thereon.

Figure 6 shows a mold with a charge of glass therein, and the closure plate before it has been lowered onto the mold.

Figure 7 is a similar view with the plate lowered into position and the parison blown in the mold.

Figure 8 is a fragmentary view showing a mold and a closure plate with a comparatively short extension or core whereby the capacity of the mold is increased.

Referring to Figure 1, the glass blowing machine comprises a mold carriage 10 rotatable about a central stationary column 11. Mounted on the carriage are parison molds 12, neck molds 13 and finishing molds 14. As the carriage rotates, the parison molds are brought successively to a charging position, at which a charge of glass 15 is dropped into the open upper end of the mold. A blowing head (not shown) may then move downward onto the mold and air under pressure is admitted through said head to compact the glass in the parison mold and also form the neck of the bottle in the neck mold. The blowing head is then withdrawn and a head 20 carrying a closure plate 21 is brought down on the mold 12 and air is then blown through the neck of the article to expand the parison 15 against the mold walls and said closure plate. The parison mold then opens, leaving the bare parison projecting upward from the neck mold. An inverting head 16 carrying the neck mold is then rotated to swing the parison downward into the open finishing mold 14 which then closes while the parison is blown to its finished form, after which the finishing mold opens and the article is discharged.

The closure plate 21 is formed with an integral extension or plug 22 which is preferably tapered to enter the upper open end of the parison mold 12, the upper walls 23 of the mold cavity being correspondingly tapered so that said plug closely fits the mold cavity. The lower surface 24 of the plug 22 may be shaped as shown to form the upper end of the glass 15 and thereby partially form the bottom of the bottle or other blown article. The plate 21 is removably supported in the head 20, the latter being formed with a recess 25 into which said plate is slid laterally and locked in position by a spring detent 26. The locking detent may be lifted to release the plate 21, by means of a finger piece 27, against the tension of a spring 28. It will be seen that with this construction the closure plate may be quickly removed by simply raising the finger piece 27 and slipping the plate out sidewise, permitting another plate to be slipped into position without interrupting or interfering with the operation of the machine. The head 20 is removably attached to the lower end of a rod 29 by means of a holding plate 30 connected to said head by bolts 32. The rod 29, as shown, is the piston rod of an air motor 33 by which the mold closure 21 is lifted and lowered.

By reference to Figure 6, it will be seen that the charge of glass 15 does not fill the mold, but leaves sufficient space to accommodate the plug 22 and a small additional air space. After said plug has been lowered to close the mold, the neck mold plunger 34 is withdrawn, leaving an initial blow opening in the neck of the blank, at which opening air under pressure is applied and the parison blown to the form shown in Figure 7, wherein the glass completely fills the mold cavity except a small blown cavity 36.

When it is desired to make articles requiring a larger charge of glass, the closure plate 21 is withdrawn and another plate having a comparatively shallow plug 22ª is substituted, thereby increasing the capacity of the mold as shown in Figure 8.

Modifications may be resorted to within the spirit and scope of my invention.

Having now described my invention, what I claim as new and desire to secure by Letters Patent of the United States, is:—

In a glass forming machine, the combination of a mold open at one end to receive its charge, a closure for the mold, a head carrying said closure, a detent by which said closure is locked to the head, and means to withdraw said detent, said closure being thereby released and free for instantaneous removal from the head.

Signed at Toledo, in the county of Lucas and State of Ohio, this 13th day of December, 1920.

ALBERT N. CRAMER.